US010584935B1

(12) United States Patent
Afshari

(10) Patent No.: US 10,584,935 B1
(45) Date of Patent: Mar. 10, 2020

(54) FIREARM MOUNTING SYSTEM AND METHOD THEREOF

(71) Applicant: 03312004 LLC, Gilbert, AZ (US)

(72) Inventor: Thomas Afshari, Gilbert, AZ (US)

(73) Assignee: 03312004 LLC, Gilbert, AZ (US)

( * ) Notice: Subject to any disclaimer, the term of this patent is extended or adjusted under 35 U.S.C. 154(b) by 0 days.

(21) Appl. No.: 16/151,006

(22) Filed: Oct. 3, 2018

(51) Int. Cl.
*F41A 23/14* (2006.01)
*F41A 23/00* (2006.01)
*F16M 11/12* (2006.01)

(52) U.S. Cl.
CPC ............ *F41A 23/14* (2013.01); *F41A 23/005* (2013.01); *F16M 11/126* (2013.01)

(58) Field of Classification Search
USPC ........... 42/94; 89/37.04, 37.05, 37.07, 37.03, 89/37.11
See application file for complete search history.

(56) References Cited

U.S. PATENT DOCUMENTS

| | | | | |
|---|---|---|---|---|
| 2,870,683 A * | 1/1959 | Wilson | ............ | F41A 23/12 89/40.06 |
| 4,819,359 A * | 4/1989 | Bassett | ............ | F41A 23/16 42/94 |
| 4,841,839 A * | 6/1989 | Stuart | ............ | F41A 23/16 269/220 |
| 8,458,946 B1 * | 6/2013 | Pintsch | ............ | F41A 23/08 42/90 |
| 2009/0026679 A1 * | 1/2009 | Harman, III | ............ | F41A 23/16 269/43 |
| 2012/0180643 A1 * | 7/2012 | Woods | ............ | F41A 27/18 89/37.04 |
| 2017/0167822 A1 * | 6/2017 | Bei | ............ | F41B 7/08 |

FOREIGN PATENT DOCUMENTS

FR 2654819 A1 * 5/1991 ............ F41A 23/24

* cited by examiner

*Primary Examiner* — Stephen Johnson
(74) *Attorney, Agent, or Firm* — Robert D. Atkins; Patent Law Group: Atkins and Associates, P.C.

(57) ABSTRACT

A firearm mounting system has an L-bracket and a mounting support coupled to a first surface of the L-bracket and adapted to rotate in a first direction. The mounting support has a shaft and a bearing disposed on the shaft extending through a first opening in the body and a second opening in the L-bracket and the bearing is disposed within the first opening. The mounting support has a fixed riser and a tensioning bar and a cam lock extending through the fixed riser and tensioning bar. A base assembly is coupled to a second surface of the L-bracket and adapted to rotate in a first direction. The base assembly has a shaft and a bearing disposed on the shaft extending through a first opening in the base body and a second opening in of the L-bracket and the bearing is disposed within the first opening.

11 Claims, 18 Drawing Sheets

FIREARM MOUNTING SYSTEM AND METHOD THEREOF

FIELD OF THE INVENTION

The present invention relates in general to firearms and, more particularly, to a firearm mounting system and method of making the system.

BACKGROUND

Modern firearms are capable of being independently and physically held by a shooter, or mounted to a support base to stabilize the firearm during aiming and firing. The support base can be a bipod mounted to an end of the barrel, or tripod mounted in proximity to a center of balance or mass of the firearm. In one example of FIG. 1, AR-10 or AR-15 style sporting rifle 100 uses tripod 102 mounted to barrel 108 forward of magazine 110. Barrel grip 112 is pressure-fit to barrel 108. Ball 114 extends from barrel grip 112 and pressure fits into receptacle or socket 116, i.e., making a ball and socket connection. When locked up, rifle 100 remains stationary on tripod 102, with no contact by the shooter, as shown in FIG. 1. Rifle 100 can be moved by loosening barrel grip 112 and sliding the grip along barrel 108. Barrel grip 112 moves the center of balance of rifle 100 relative to tripod 102. Rifle 100 can also be moved by loosening receptacle 116 to allow ball 114 to move freely within the receptacle. The movement of ball 114 with respect to receptacle 116 (ball and socket) provides for changes in elevation of barrel 108 and 360 degree lateral swivel, as well as 90 degree side rotation, of rifle 100.

Tripod mount 102 provides a platform and full range of motion to aim and discharge the firearm. Tripod mount 102 may be set to a loose position to exhibit continuous freedom of movement, in which case the shooter must provide the final degree of stability to hold the firearm still after each change in position. The continuous freedom movement setting of tripod 102 can cause mis-targeting as shooters often have difficulty holding rifle 100 steady, even when resting on the tripod. Tripod mount 102 may be locked down or set tight to hold rifle 100 stationary, independent of the shooter, see FIG. 1. However, each change in position or re-aim of rifle 100 requires unlock or loosening of ball and socket 114-116, and then re-tightening. Ball and socket type connections are known to have variation, particularly for precision, steady applications. Any unintended movement of ball 114 with respect to receptacle 116 before, during, or after re-tightening adversely effects the new position and aim of rifle 100. The shooter may believe the target is dead on the cross-hairs when tightening ball and socket 114-116, only to find a targeting discrepancy once rifle 100 is locked in place. Tripod mount 102 with ball and socket 114-116 is unforgiving and sensitive to touch and pressure when making adjustments.

DETAILED DESCRIPTION OF THE DRAWINGS

The following describes one or more embodiments with reference to the figures, in which like numerals represent the same or similar elements. While the figures are described in terms of the best mode for achieving certain objectives, the description is intended to cover alternatives, modifications, and equivalents as may be included within the spirit and scope of the disclosure.

Figure 1:
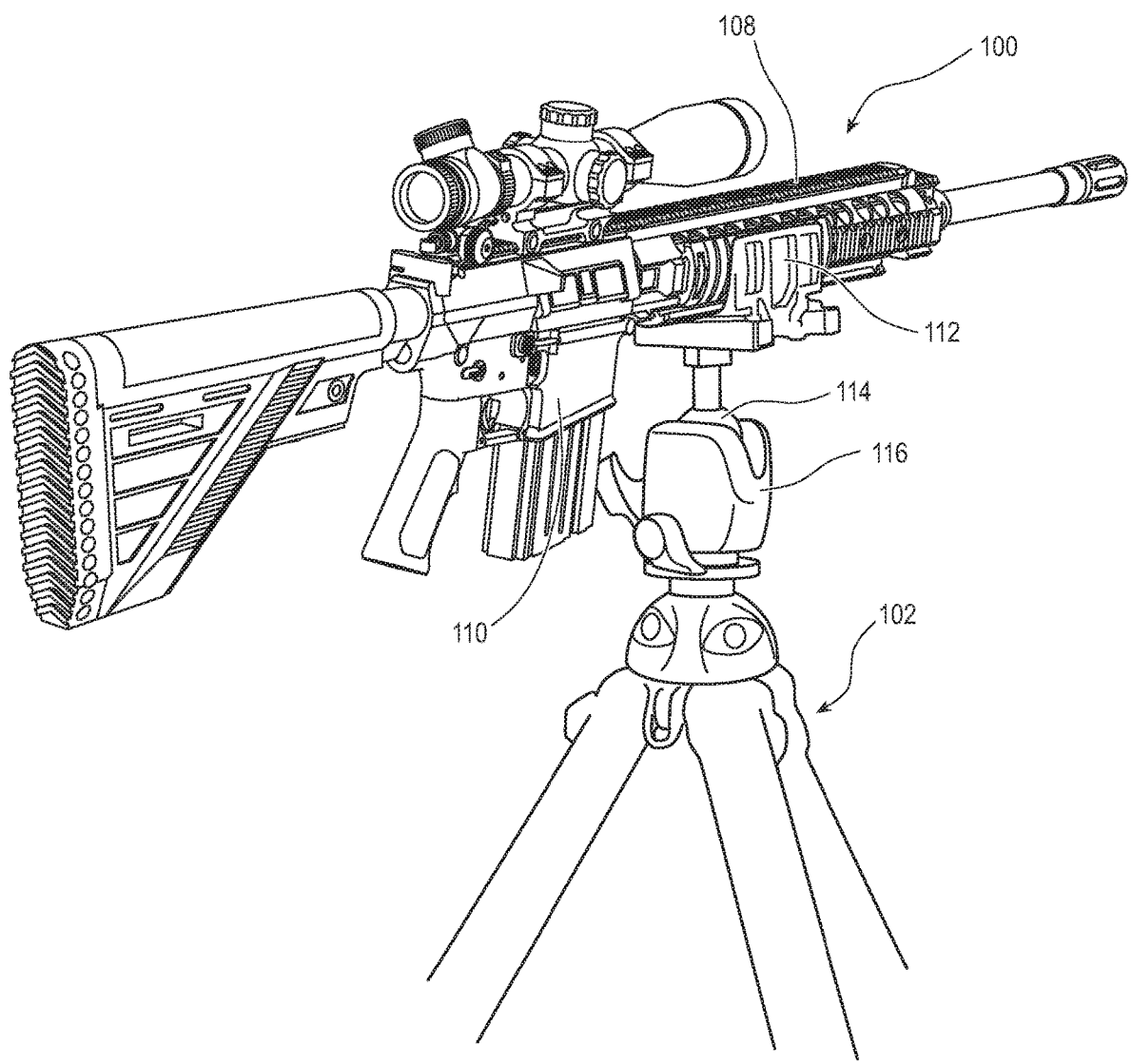
FIG. 1 illustrates a sporting rifle supported by a conventional tripod.
Figures 2A, 2B:
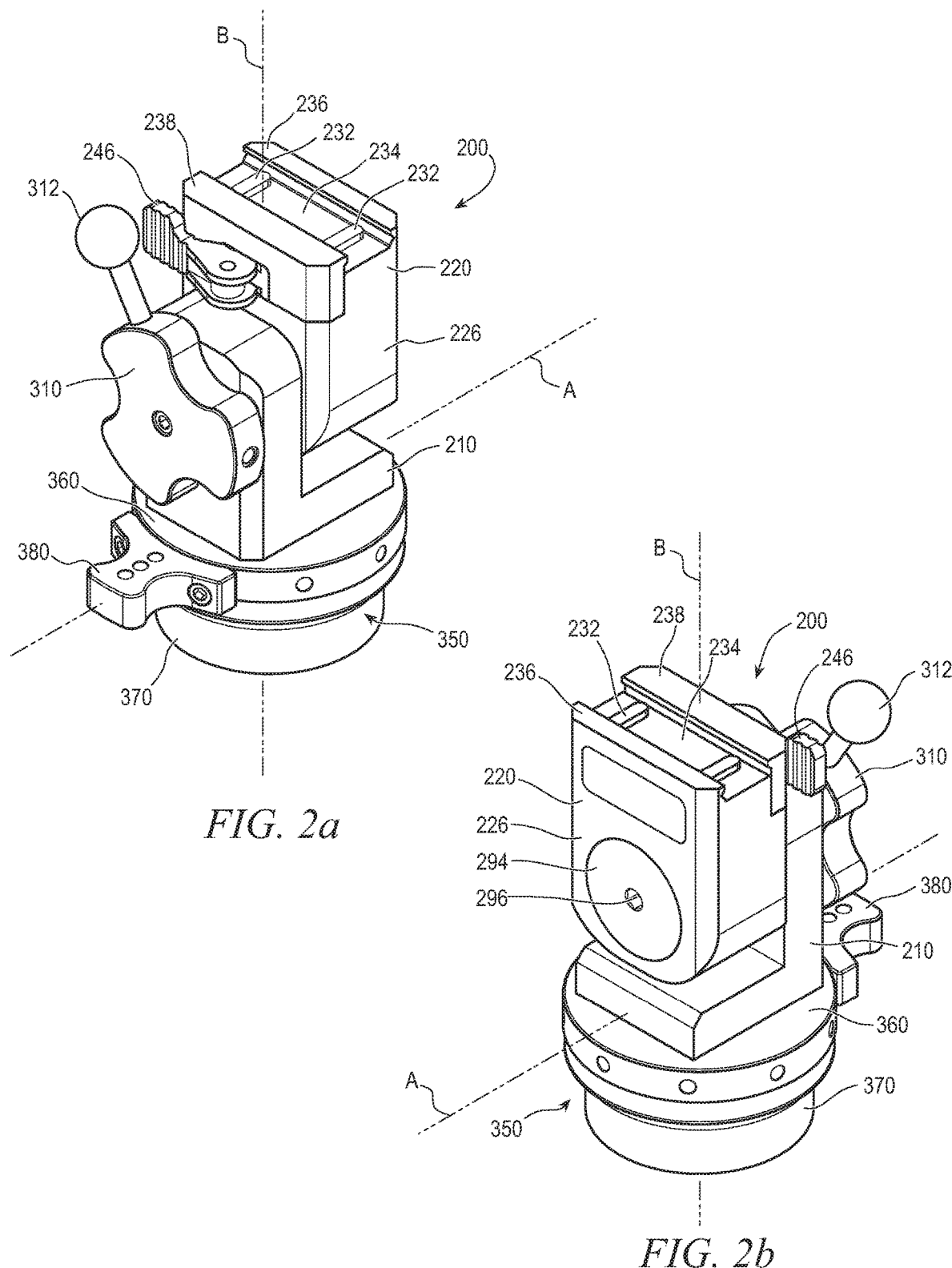
FIGS. 2a-2b illustrate a firearm mounting system with adjustments for sighting the firearm.
Figure 3A:
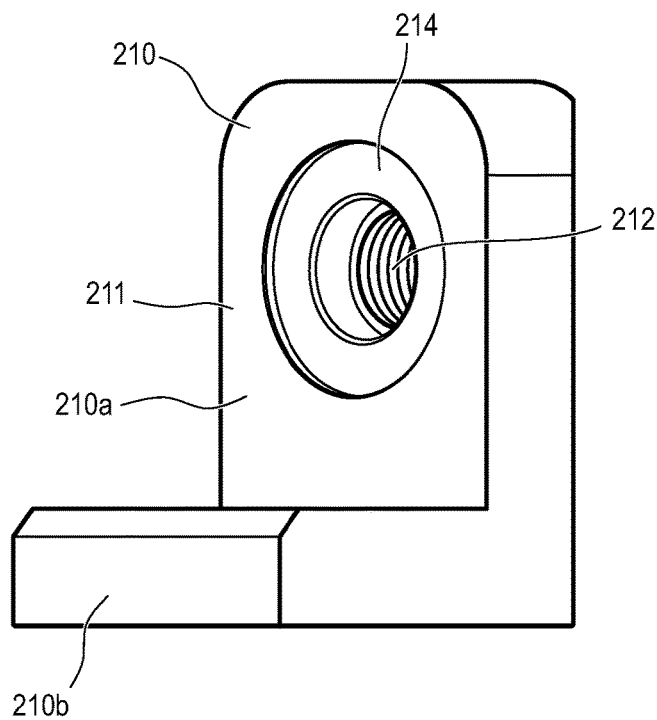
FIGS. 3a-3b illustrate an L-bracket for the firearm mounting system.
Figure 3B:
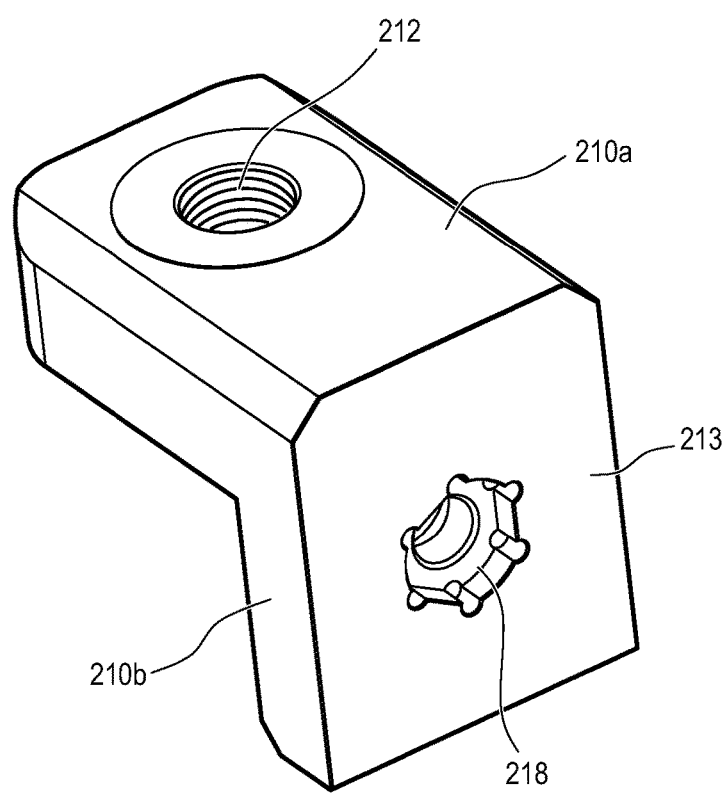

FIGS. 2a-2b illustrate firearm mounting system 200 from opposite perspectives or orientations. Firearm mounting system 200 includes L-bracket 210 made with a strong and light-weight material, such as 7075 aluminum/zinc alloy. Alternatively, L-bracket 210 is made with stainless steel. Firearm mounting support 220 rotating about axis A in FIG. 2a provides elevation control of the firearm. Base assembly 350 rotating about axis B provides lateral control of the firearm. L-bracket 210 coordinates axis A elevation control with axis B lateral control. FIG. 3a shows further detail of L-bracket 210 with vertical portion 210a and horizontal portion 210b, oriented perpendicular at 90 degrees. Vertical portion 210a has threaded opening 212 and recessed area 214 in a first surface 211 of L-bracket 210. FIG. 3b shows another orientation of L-bracket 210 with threaded opening 212 through vertical portion 210a and keyed opening 218 into a second surface 213 of horizontal portion 210b of L-bracket 210.

Figure 4A:
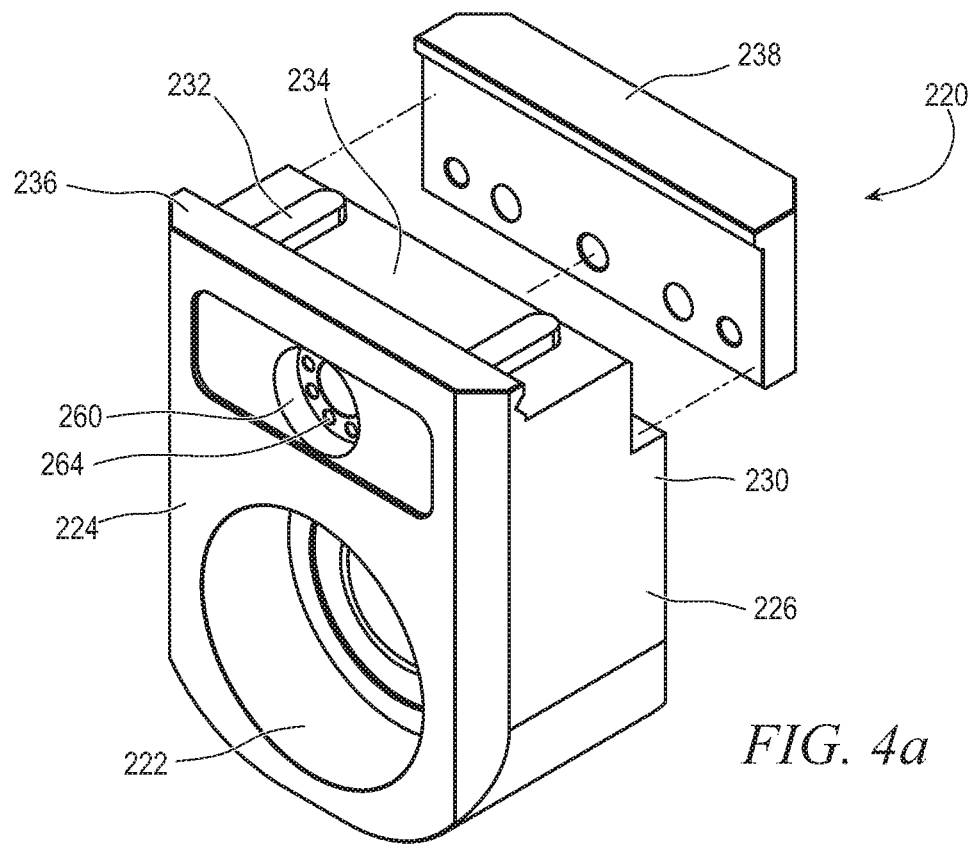
FIGS. 4a-4d illustrate a mounting support for the firearm mounting system.
Figure 4B:
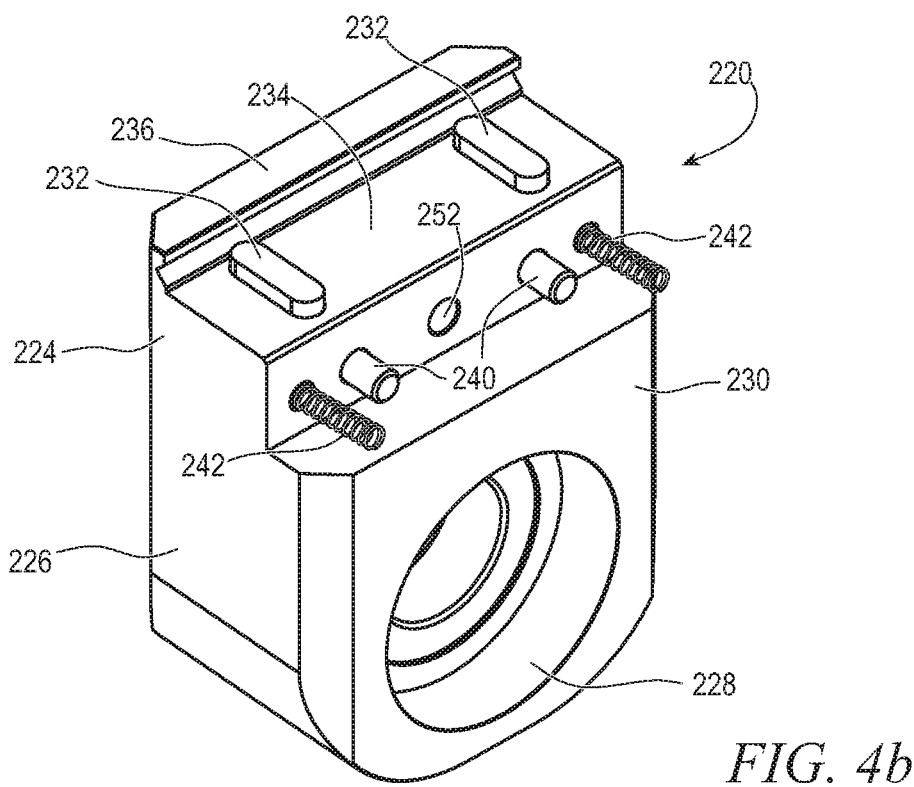
Figure 4C:
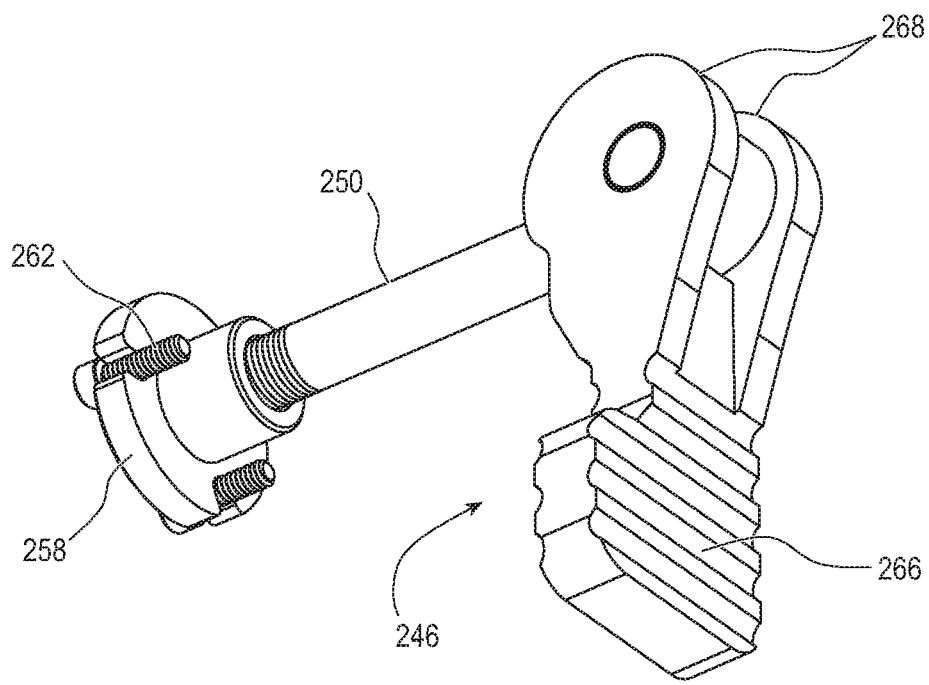
Figure 4D:
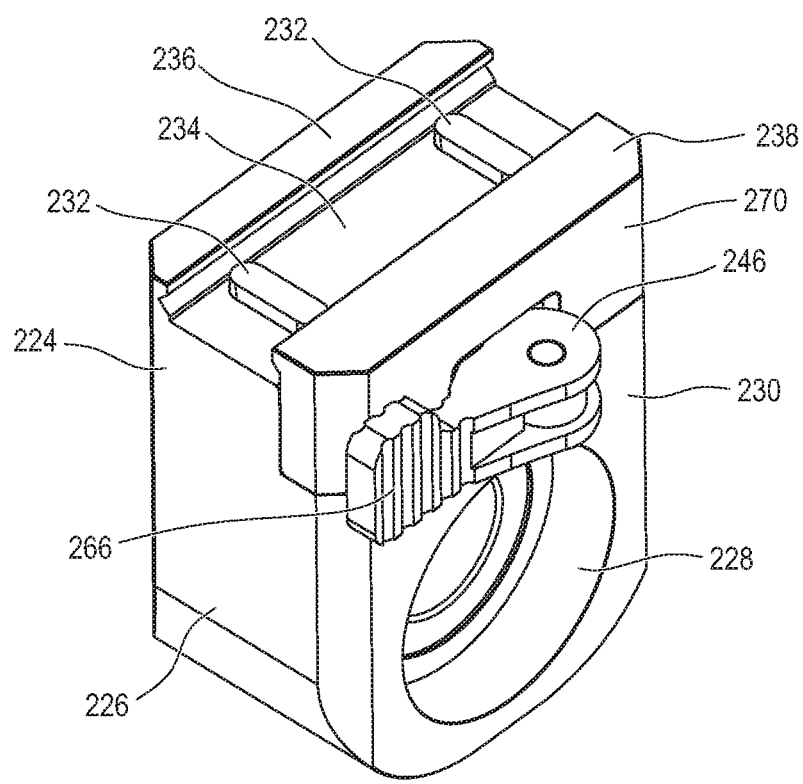

In FIGS. 2a-2b, firearm mounting system 200 includes firearm mounting support 220. In one embodiment, mounting support 220 is made with 7075 aluminum/zinc alloy. Alternatively, firearm mounting support 220 is made with stainless steel. FIGS. 4a-4b show firearm mounting support 220 from opposite perspectives or orientations with a first circular opening 222 in surface 224 of body 226 designated for inserting a first bearing 292, and a second circular opening 228 in surface 230 of body 226 designated for inserting a second bearing 288. Pads 232 are disposed on surface 234 of body 226 designated to contact a portion of the firearm, e.g., barrel assembly. The firearm rests on pads 232 and is held in place by pressure fit between fixed riser 236 of firearm mounting support 220 and tensioning bar 238. FIG. 4b shows guide pins 240 and springs 242 for use in aligning and tensioning of bar 238. In FIG. 4c, cam lock 246 includes shaft 250 extending through an opening in tensioning bar 238 and opening 252 through body 226. Anchor 258 is inserted into opening 260 in surface 224 of body 226 and secured with screws 262 into threaded openings 264. In FIG. 4d, tensioning bar 238 slides over guide pins 240 under compression of springs 242. Shaft 250 is threaded into anchor 258. Lever 266 includes lobe 268 disposed partially within a recess of tensioning bar 236. Moving lever 266 to a position perpendicular to surface 270 effectively lengthens cam lock 246 allowing springs 242 to push tensioning bar 238 away from fixed riser 236. The increase in distance between fixed riser 236 and tensioning bar 238 releases the firearm to be removed from mounting support 220 and firearm mounting system 200. Moving lever 266 to a position parallel to surface 270, as shown in FIG. 4d, effectively shortens cam lock 246 and compresses springs 242 to push tensioning bar 238 toward fixed riser 236. The decrease in distance between fixed riser 236 and tensioning bar 238 tightens the firearm to mounting support 220.

Figure 5A:
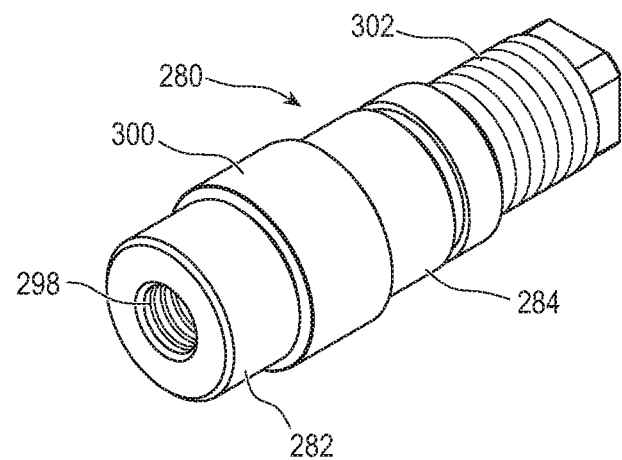
FIGS. 5a-5g illustrate the bearing assembly for the mounting support.
Figure 5B:
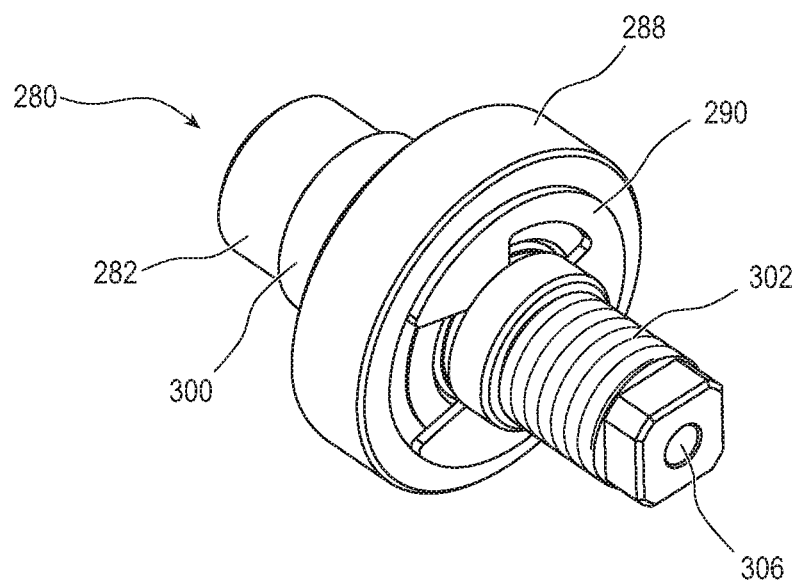
Figure 5C:
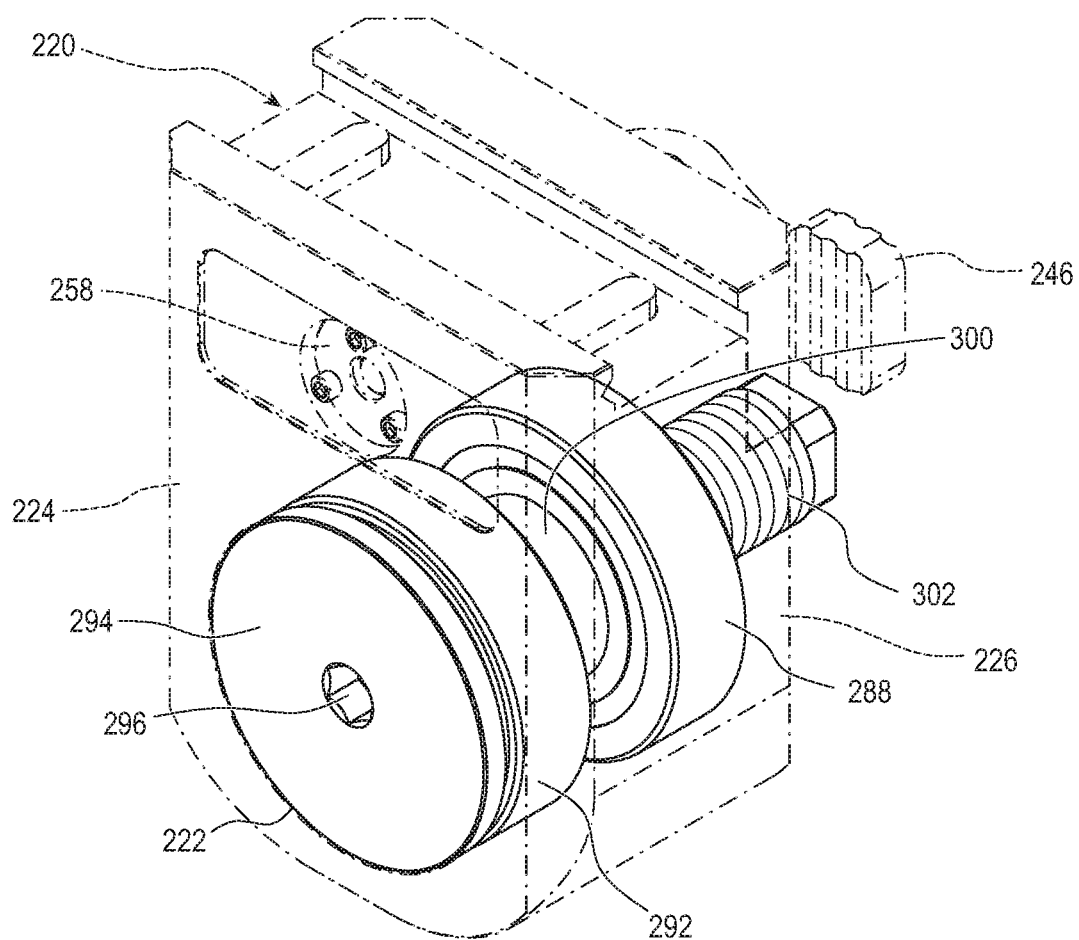
Figure 5D:
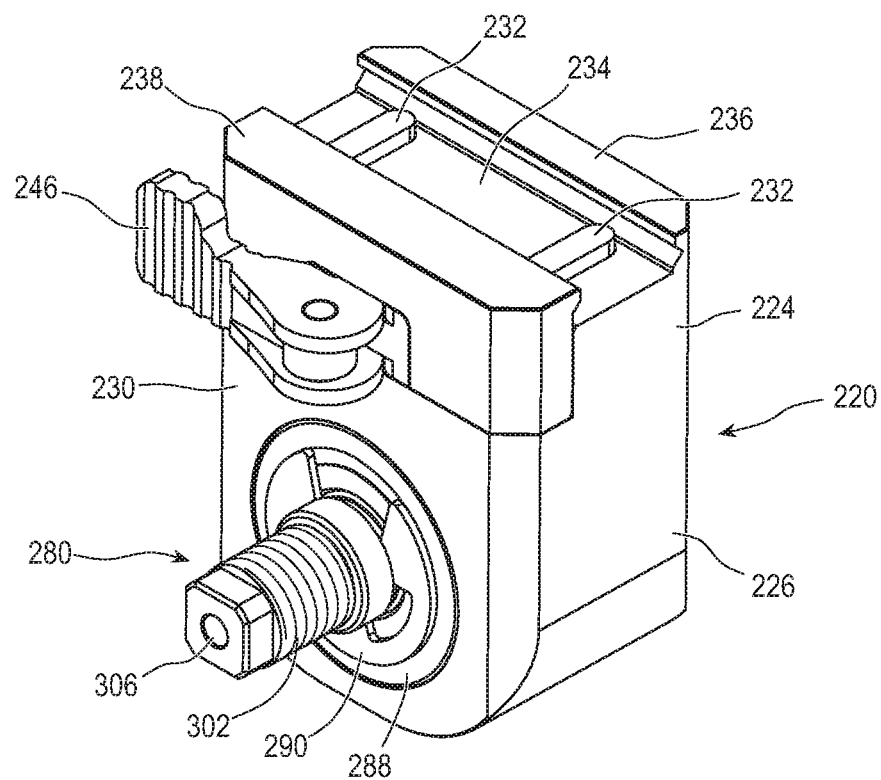
Figure 5E:
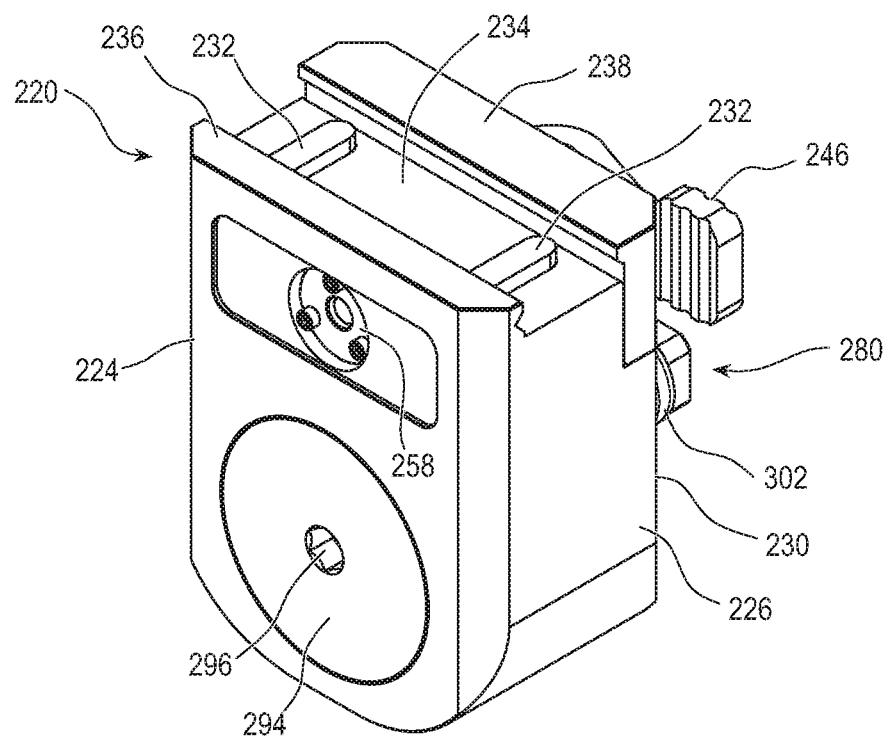
Figure 5F:
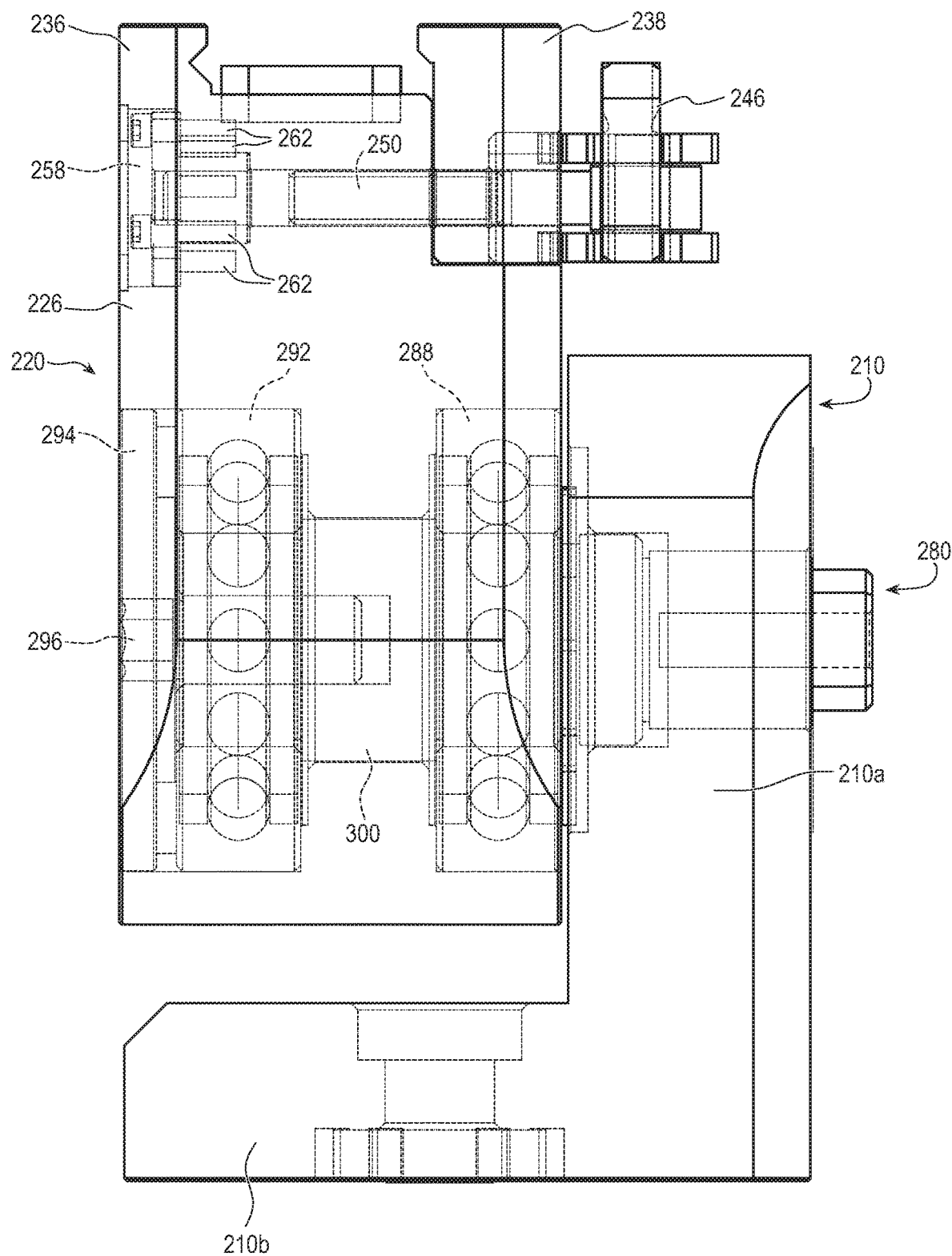
Figure 5G:
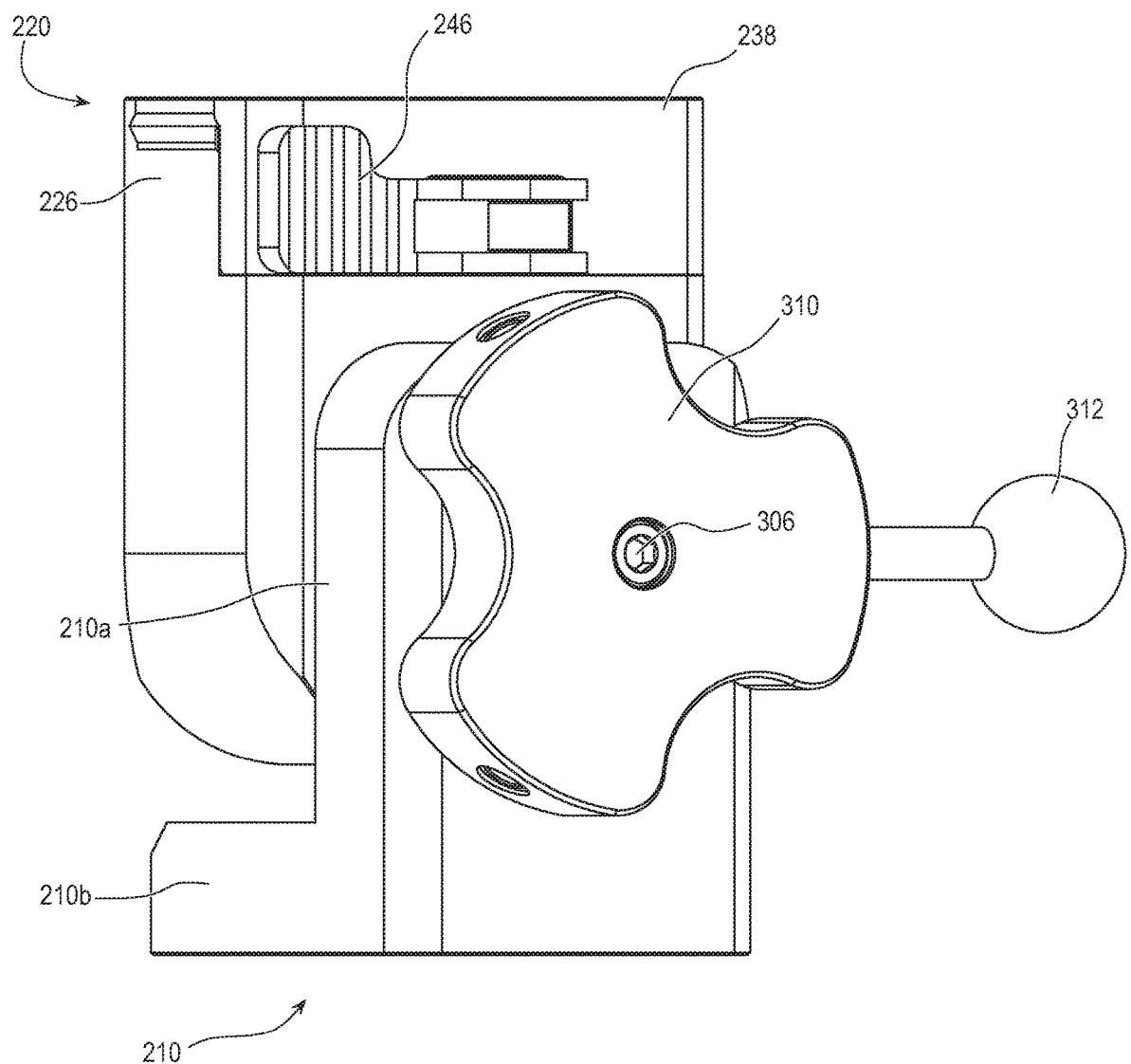

FIGS. 5a-5g show further detail of firearm mounting support 220 including shaft 280 with bearing surfaces 282 and 284. In FIG. 5b, bearing 288 is mounted to bearing surface 284 and held is place with retaining ring 290. Shaft 280 with second bearing 288 is inserted into second opening 228 of FIG. 4b. In FIG. 5c, first bearing 292 is disposed within first opening 222 and over bearing surface 282. End-cap 294 is threaded into opening 298 of shaft 280 to secure bearings 288 and 292 in place within openings 222 and 228, respectively. End-cap 294 includes opening 296 adapted for fitting a hand tool, such as a wrench or screwdriver. Spacer 300 separates bearing 288 from bearing 292 and provides a stable platform for bearing rotation. FIG. 5d shows shaft 280 extending through mounting support 220 with exposed threaded portion 302. FIG. 5e shows an opposite perspective of shaft 280 extending through mounting support 220 held in place with end-cap 294. FIG. 5f shows threaded portion 302 of shaft 280 mating with threaded opening 212 of L-bracket 210. Retaining ring 290 is disposed within recessed area 214. Body 226 of mounting support 220 rotates independent of shaft 280 and L-bracket 210 by nature of bearings 288 and 292, approximately 110 degrees of bearing rotation in each direction. The free rotation of body 226 on bearings 288 and 292 provides elevation control of the firearm. FIG. 5g shows control knob 310 for tightening firearm mounting support 220 to L-bracket 210. Control knob 310 can be turned by hand and secures into threaded opening 306. Lever 312 provides additional leverage and fine control over the movement of control knob 310 and firearm mounting support 220. The shooter turns control knob 310 and/or lever 312 to extend shaft 280 and move surface 230 of body 226 away from horizontal portion 210a, or at least reduce the pressure contact between surface 230 and horizontal portion 210a sufficient to permit body 226 to rotate. Shaft 280 can also be extended by rotating end-cap 294 with a hand tool. Body 226 is free to rotate independent of shaft 280 by nature of bearings 288 and 292. While body 226 of firearm mounting support 220 is free to rotate, the shooter adjusts the elevation of the firearm by rotating body 226 on bearings 288 and 292. Body 226 has a continuous range of motion within ±110 degrees of vertical. When the sight elevation is set, the shooter turns control knob 310 and/or lever 312 (or end-cap 294) to draw shaft 280 further into opening 212 and move surface 230 of body 226 into pressure contact with horizontal portion 210a, which locks firearm mounting support 220 and the firearm in position.

Figure 6A:
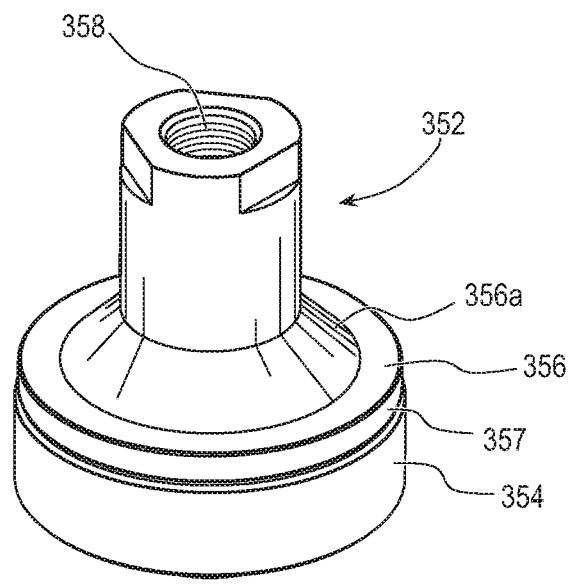
FIGS. 6a-6g illustrate a base assembly with bearing for the firearm mounting system.
Figure 6B:
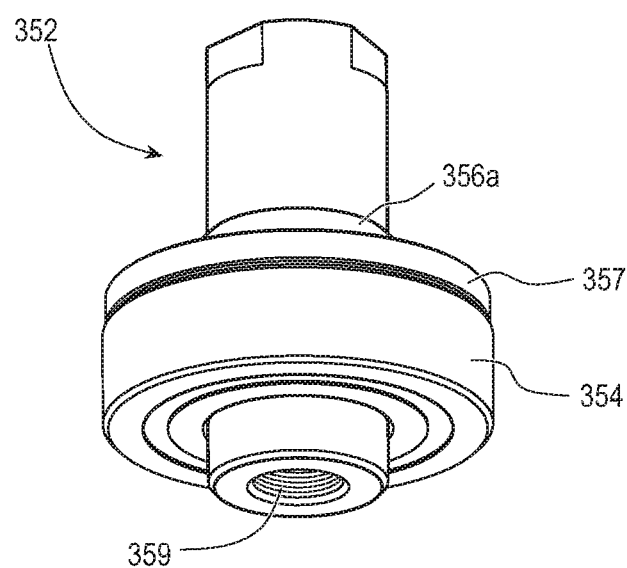
Figure 6C:
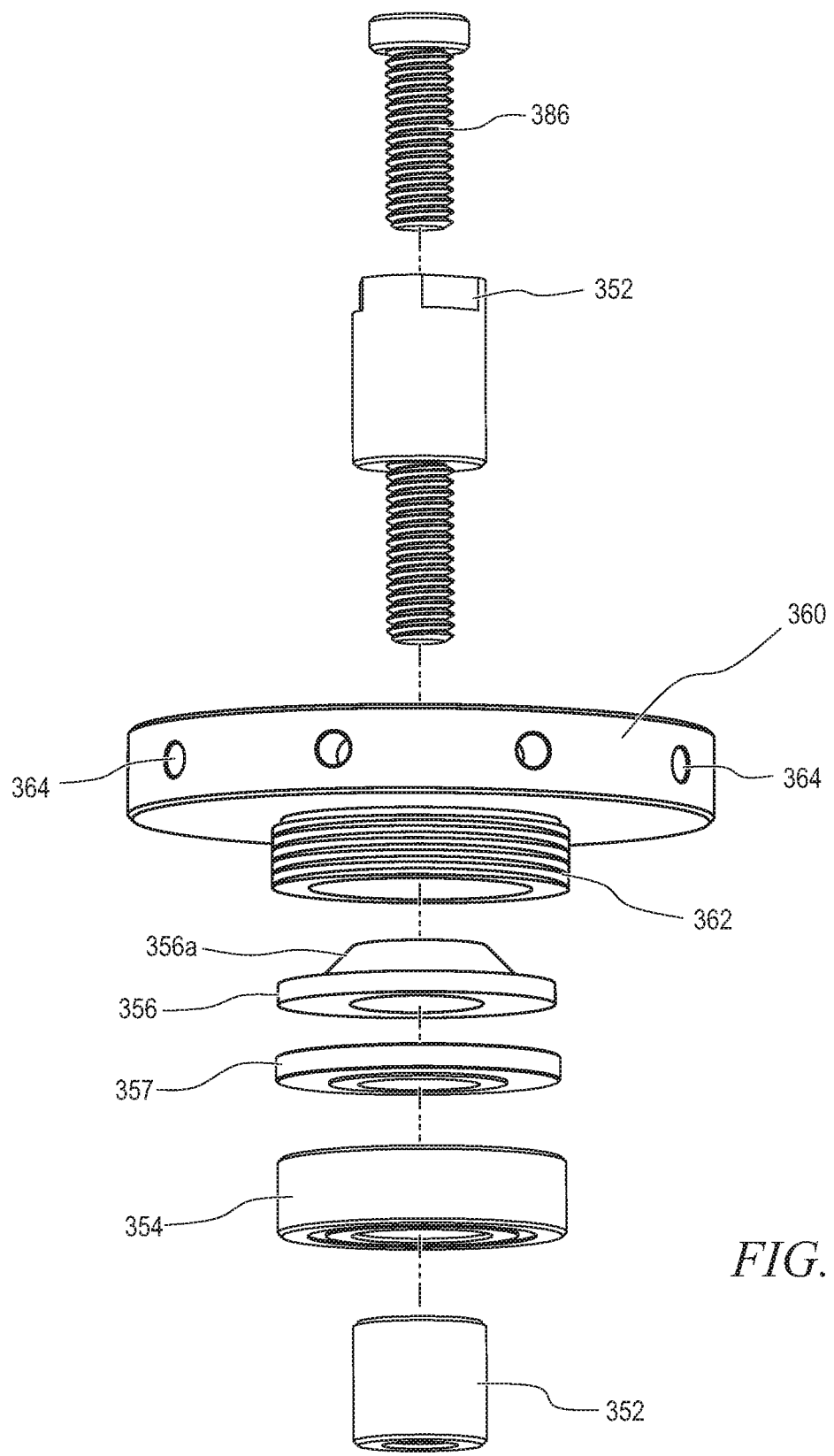
Figure 6D:
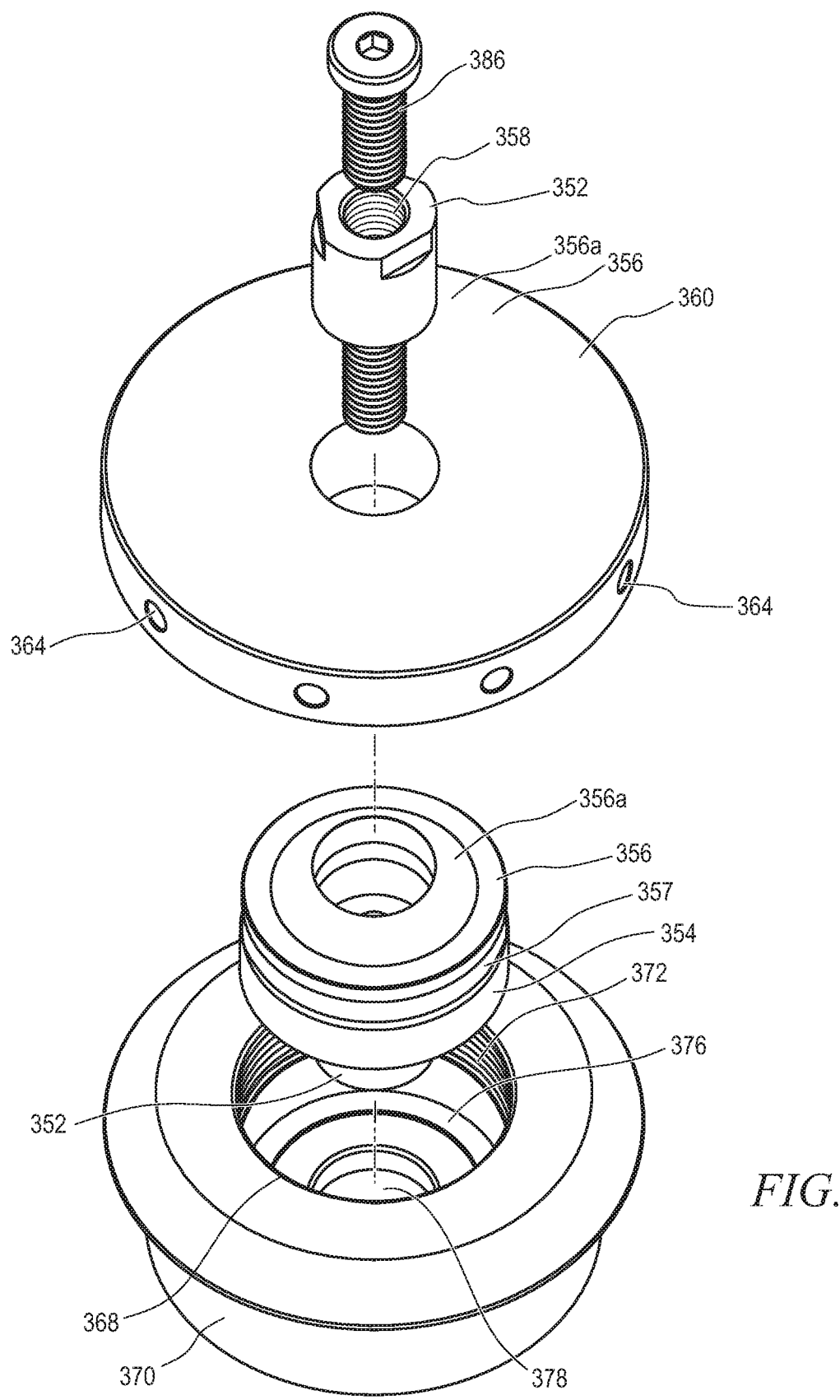
Figure 6E:
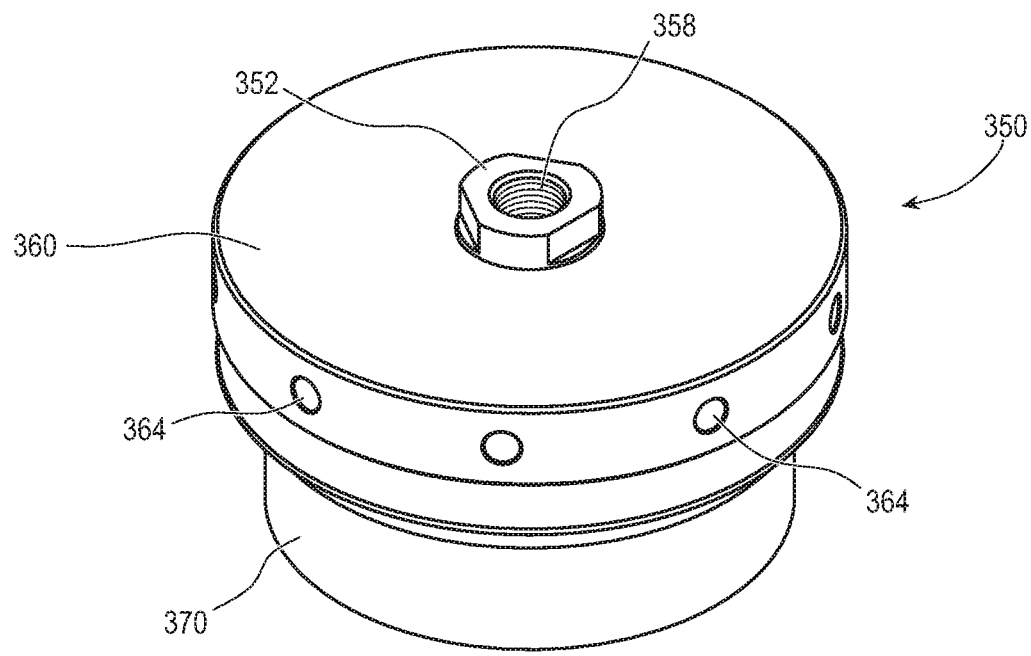
Figure 6F:
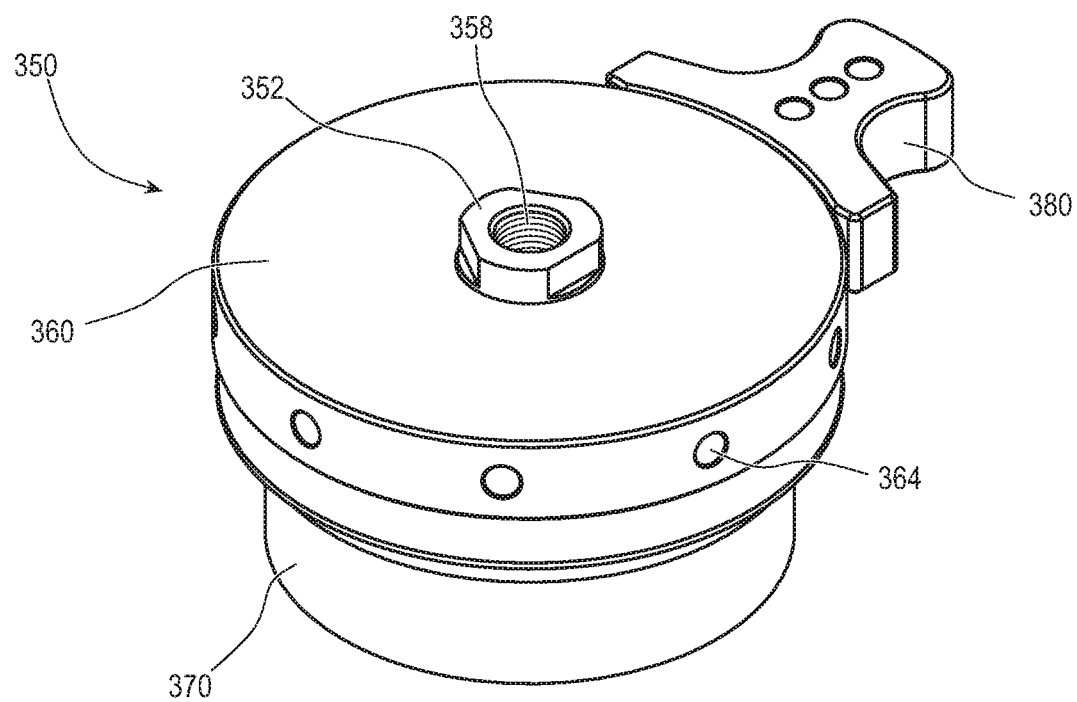
Figure 6G:
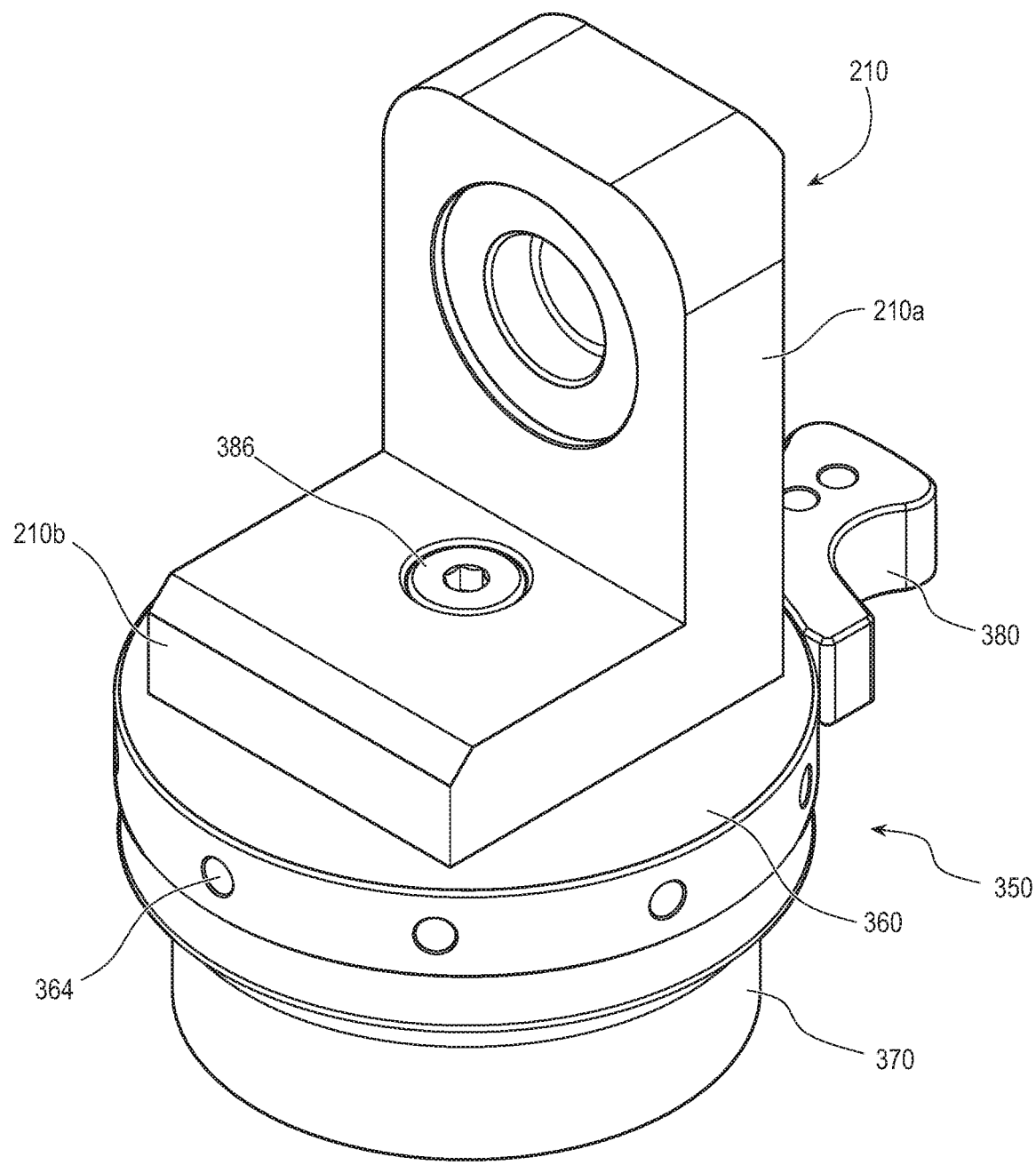

In FIGS. 2a-2b, firearm mounting system 200 includes base assembly 350. In one embodiment, base assembly 350 is made with 7075 aluminum/zinc alloy. Alternatively, base assembly 350 is made with stainless steel. FIGS. 6a-6b show shaft 352 with a third bearing 354, surface 356 with angled portion 356a on spacer 357, and threaded opening 358. Surface 356 is coated with epoxy sealant to increase the friction coefficient. In FIG. 6c, control hub 360 with threaded surface 362 is disposed over shaft 352 proximate to bearing 354. Control hub 362 has openings 364 to attach a rotational control lever. Openings 364 also provide harmonic dampening during discharge of the firearm. Openings 364 can be filled with a filler material, such as silicone, or empty and devoid of material. In FIG. 6d, the assembly including shaft 352, bearing 354, and control hub 360 is aligned with opening 368 in base body 370. When assembled, threaded surface 362 mates with threaded portion 372, surface 356 with angled portion 356a meets with an angled inside surface 374 of threaded portion 372, bearing 354 is press fit against surface 376 within opening 368, and shaft 352 extends through opening 378. FIG. 6e shows completed base assembly 350. In FIG. 6f, lever 380 is coupled to control hub 360 via openings 364. In FIG. 6g, horizontal portion 210b of L-bracket 210 is mounted to control hub 360 with bolt 386.

Control hub 360 and/or lever 380 is used to tighten or loosen L-bracket 210 to base assembly 350. Control hub 360 can be turned by hand and mates threaded surface 362 into threaded surface 372. The shooter turns control hub 360 to extend shaft 352 and move surface 374 away from surface 356, or at least reduce the pressure contact between surface 374 and surface 356 sufficient to permit base body 370 to rotate. Base body 370 is free to rotate independent of shaft 352 by nature of bearing 354. While body 370 is free to rotate, the shooter adjusts the lateral or yaw movement of the firearm by rotating body 370 on bearing 354. When the lateral sight adjustment is set, the shooter turns control hub 360 and/or lever 380 to draw shaft 352 further into opening 368 and move surface 374 into pressure contact with surface 356, which locks base assembly 350 and the firearm in position.

Figure 7:
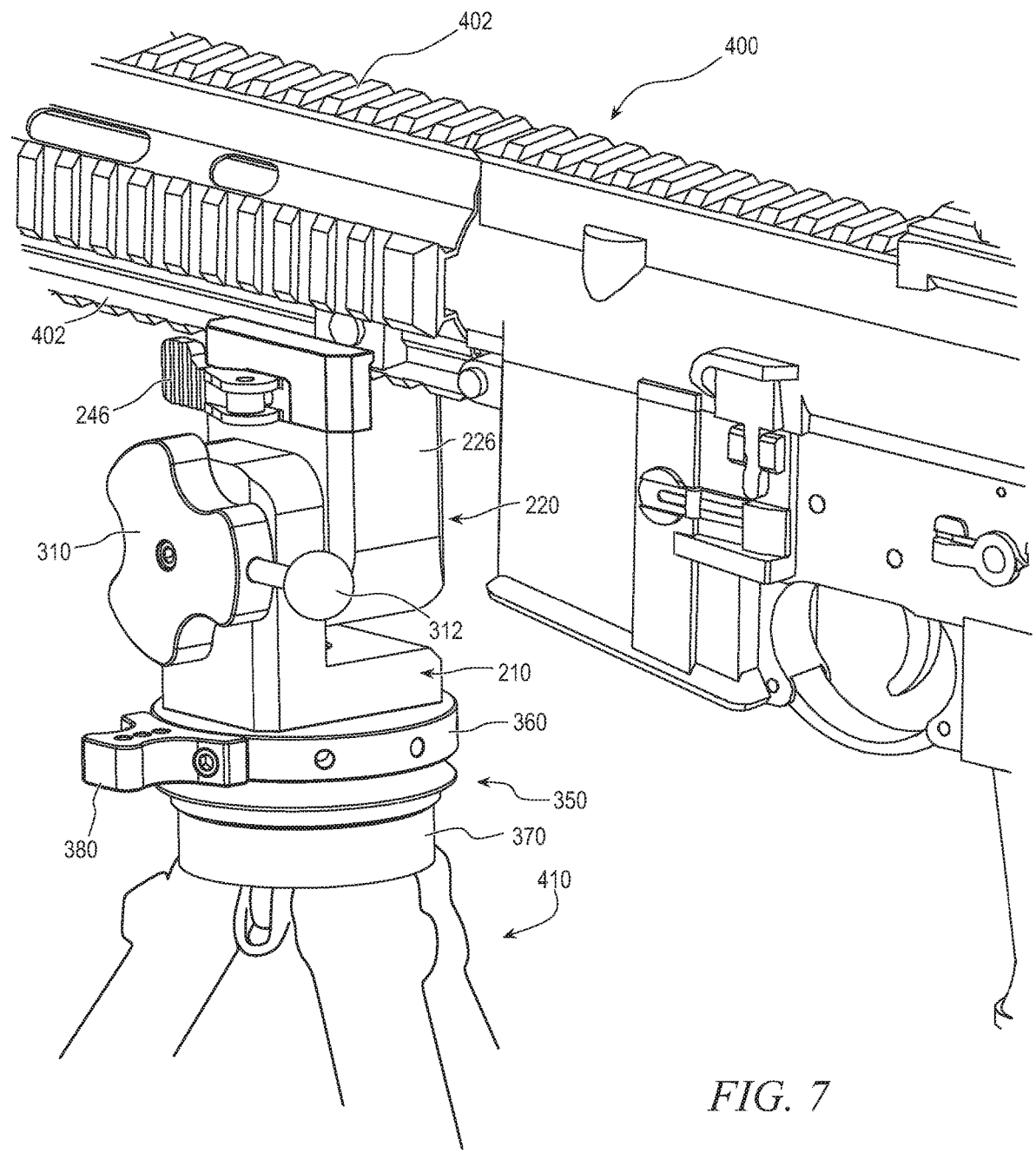
FIG. 7 illustrates a firearm mounted to the mounting system.
Figure 8A:
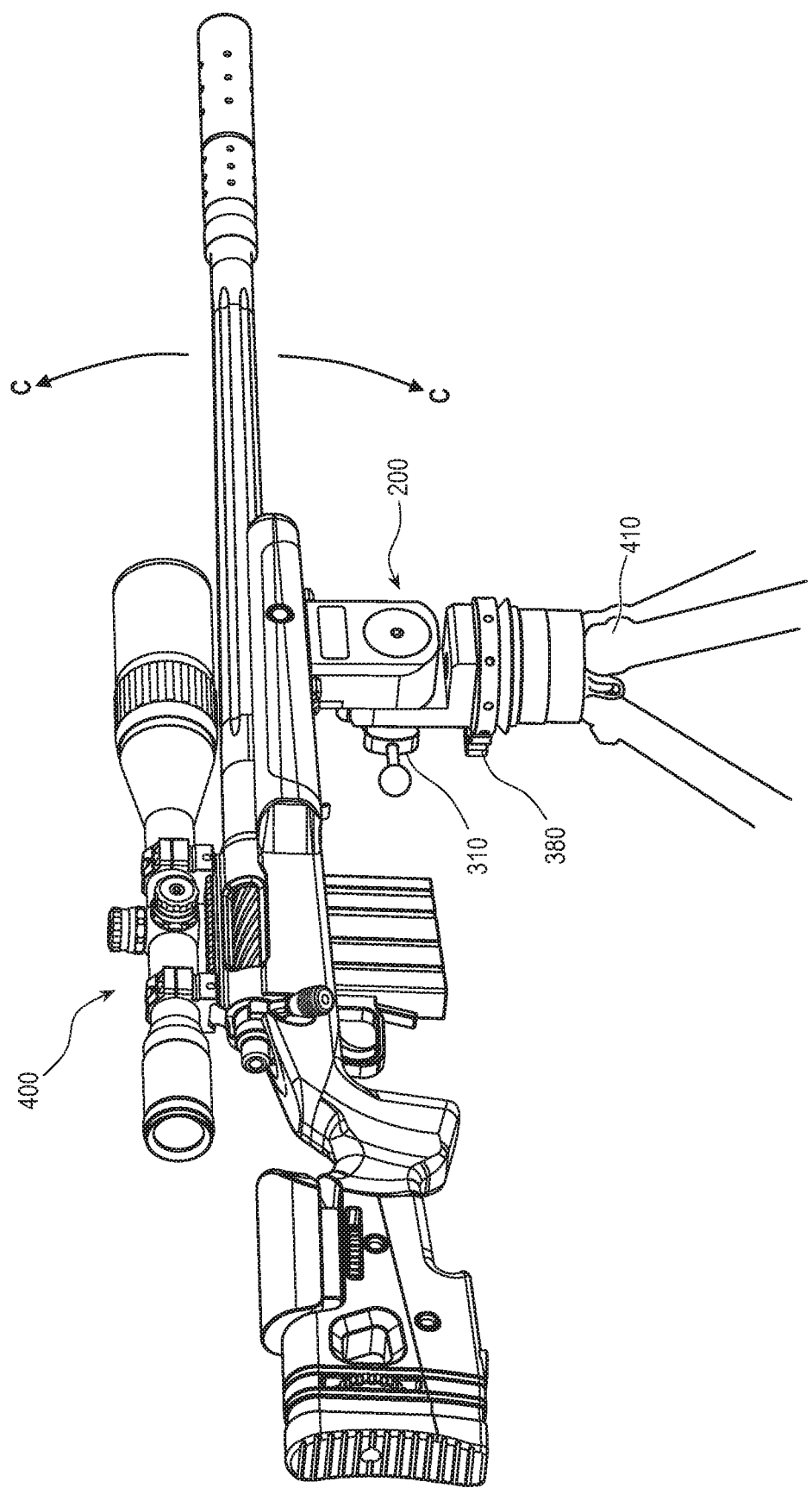
FIGS. 8a-8b illustrate adjustments to sighting the firearm using the firearm mounting system.
Figure 8B:
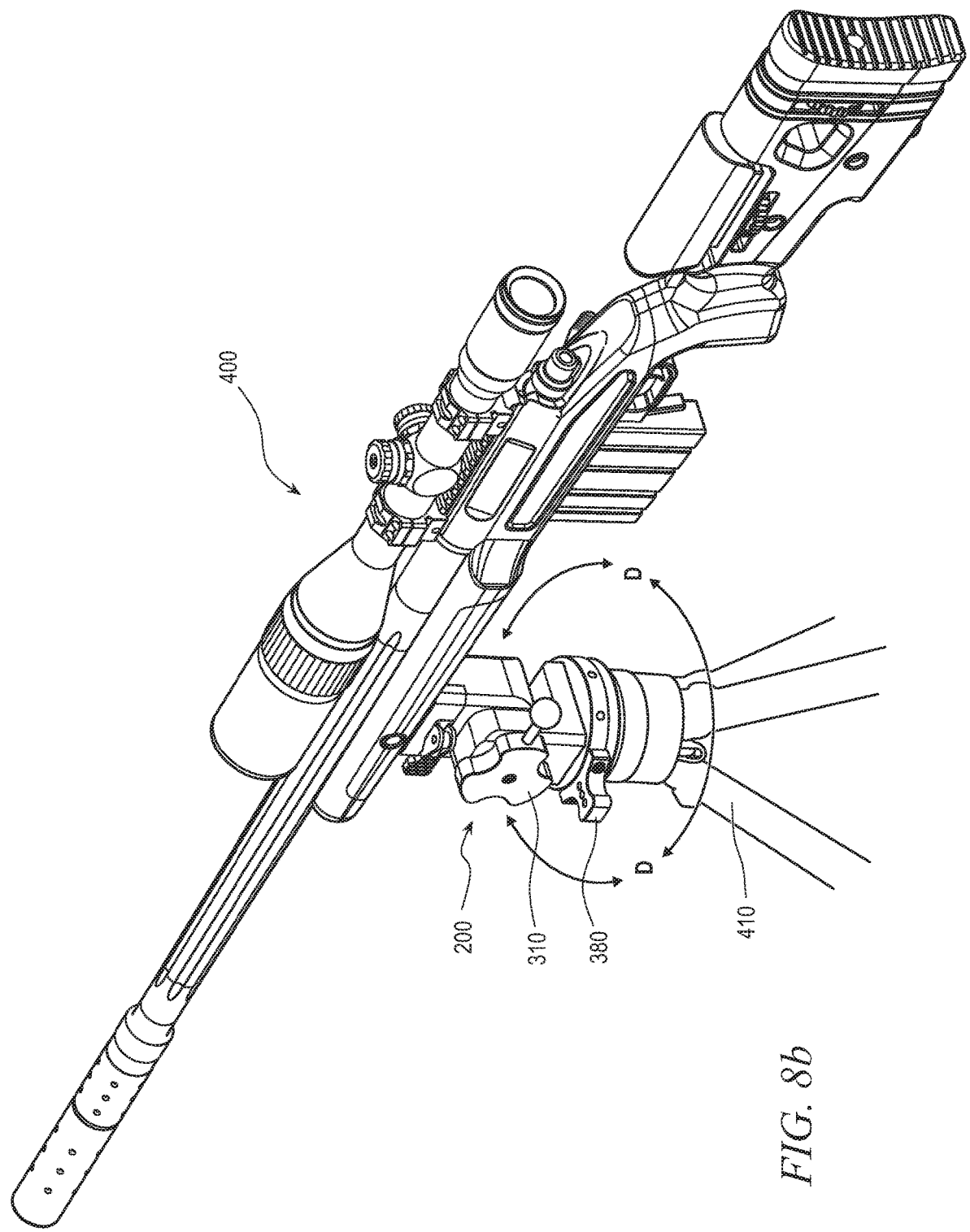

FIG. 7 illustrates firearm 400 mounted to firearm mounting system 200. Barrel 402 of firearm 400 is disposed on pads 232 over surface 234 and secured by shifting lever 266 to the locked position parallel to surface 230. Barrel 402 is held between fixed riser 236 and tensioning bar 238. Firearm mounting system 200 is mounted to tripod 410 through opening 359 in shaft 352. To adjust the elevation of firearm 400, control knob 310 is rotated to extend shaft 280 and move surface 230 of body 226 away from horizontal portion 210a of L-bracket 210. Shaft 280 can also be extended by rotating end-cap 294 with a hand tool. The shooter adjusts the elevation of firearm 400 by direction arrows C, as shown in FIG. 8a. Body 226 of mounting support 220 smoothly rotates on bearings 288 and 292 isolated from shaft 280. With the elevation set, control knob 310 is rotated to tighten the contact between surface 230 of body 226 and horizontal portion 210a of L-bracket 210. The desired elevation is locked in place. To adjust the lateral or yaw movement of firearm 400, control hub 360 is turned with control lever 380 to loosen the contact between surface 374 and surface 356. The shooter adjusts the lateral position of firearm 400 by direction arrows D, as shown in FIG. 8b. Base body 370 smoothly rotates on bearing 354. Control hub 360 provides 360 degrees of lateral movement of firearm 400. With the lateral position set, control hub 360 is rotated to tighten the contact between base body 370 and L-bracket 210. The desired lateral position is locked in place.

While one or more embodiments have been illustrated and described in detail, the skilled artisan will appreciate that modifications and adaptations to those embodiments may be made without departing from the scope of the present disclosure.

What is claimed:
1. A firearm mounting system, comprising:
   a bracket;
   a mounting support coupled to a first surface of the bracket providing elevation control of the firearm mounting system, wherein the mounting support includes,
      (a) a first shaft with a first bearing and a second bearing disposed over the first shaft to provide rotation of the mounting support,

(b) a fixed riser, and
(c) a tensioning bar opposite the fixed riser adapted for securing a firearm to the mounting support;
a base assembly coupled to a second surface of the bracket which is perpendicular to the first surface of the bracket and provides azimuthal control of the firearm mounting system, wherein the base assembly includes a third bearing to provide rotation of the base assembly; and
a cam lock extending through the fixed riser and the tensioning bar.

2. A firearm mounting system, comprising:
a bracket;
a mounting support coupled to a first surface of the bracket providing elevation control of the firearm mounting system, wherein the mounting support includes a first shaft with a first bearing and a second bearing disposed over the first shaft to provide rotation of the mounting support; and
a base assembly coupled to a second surface of the bracket which is perpendicular to the first surface of the bracket and provides azimuthal control of the firearm mounting system, wherein the base assembly includes,
(a) a third bearing to provide rotation of the base assembly,
(b) a second shaft, wherein the third bearing is disposed on the second shaft, and
(c) a body, wherein the second shaft extends through a first opening in the body and a second opening in the second surface of the bracket and the third bearing is disposed within the first opening.

3. The firearm mounting system of claim 1, wherein the bracket includes an L-shape.

4. The firearm mounting system of claim 1, wherein the mounting support includes a body, wherein the first shaft extends through a first opening in the body and a second opening in the first surface of the bracket and the first bearing is disposed within the first opening.

5. A firearm mounting system, comprising:
an L-shaped bracket including a first surface perpendicular to a second surface;
a mounting support coupled to the first surface of the L-shaped bracket and adapted to rotate in elevation, wherein the mounting support includes,
(a) a fixed riser, and
(b) a tensioning bar opposite the fixed riser adapted for securing a firearm to the mounting support;
a base assembly coupled to the second surface of the L-shaped bracket and adapted to rotate in azimuth; and
a cam lock extending through the fixed riser and the tensioning bar.

6. The firearm mounting system of claim 5, wherein the mounting support includes:
a shaft;
a bearing disposed on the shaft; and
a body, wherein the shaft extends through a first opening in the body and a second opening in the first surface of the L-shaped bracket and the bearing is disposed within the first opening.

7. The firearm mounting system of claim 6, wherein the mounting support includes a control hub coupled to the shaft for moving the shaft independent of the body.

8. A firearm mounting system, comprising:
an L-shaped bracket including a first surface perpendicular to a second surface;
a mounting support coupled to the first surface of the L-shaped bracket and adapted to rotate in elevation; and
a base assembly coupled to the second surface of the L-shaped bracket and adapted to rotate in azimuth, wherein the base assembly includes,
(a) a shaft,
(b) a bearing disposed on the shaft, and
(c) a body, wherein the shaft extends through a first opening in the base body and a second opening in the second surface of the L-shaped bracket and the bearing is disposed within the first opening.

9. A method of making a firearm support system, comprising:
providing an L-shaped bracket including a first surface perpendicular to a second surface;
disposing a mounting support on the first surface of the L-shaped bracket and adapted to rotate in elevation;
disposing a base assembly on the second surface of the L-shaped bracket and adapted to rotate in azimuth;
providing a fixed riser;
providing a tensioning bar opposite the fixed riser adapted for securing a firearm to the mounting support; and
providing a cam lock extending through the fixed riser and the tensioning bar.

10. The method of claim 9, further including:
providing a shaft;
disposing a bearing disposed on the shaft; and
providing a body, wherein the shaft extends through a first opening in the body and a second opening in the first surface of the L-shaped bracket and the bearing is disposed within the first opening.

11. The method of claim 10, further including providing a control hub coupled to the shaft for moving the shaft independent of the body.

* * * * *